(12) United States Patent
Kerr et al.

(10) Patent No.: US 7,668,551 B2
(45) Date of Patent: Feb. 23, 2010

(54) TWO STEP DATABASE INTERROGATION FOR SUPPORTING THE IMPLEMENTATION OF A FALL-BACK AT CALL SET-UP

(75) Inventors: John Kerr, Herzogenrath (DE); Patrice Hédé, Enghien-les-Bains (FR); Jorg Shrader, Wurselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 222 days.

(21) Appl. No.: 10/539,194

(22) PCT Filed: Dec. 6, 2003

(86) PCT No.: PCT/EP03/13862

§ 371 (c)(1),
(2), (4) Date: Apr. 20, 2006

(87) PCT Pub. No.: WO2004/066649

PCT Pub. Date: Aug. 5, 2004

(65) Prior Publication Data

US 2006/0211422 A1    Sep. 21, 2006

(30) Foreign Application Priority Data

Jan. 18, 2003  (EP) .................................. 03001080

(51) Int. Cl.
H04W 40/00    (2009.01)
H04L 12/26    (2006.01)
(52) U.S. Cl. ...................... 455/445; 370/236
(58) Field of Classification Search ................ 455/445, 455/452.2, 418, 433
See application file for complete search history.

(56) References Cited

U.S. PATENT DOCUMENTS

| 5,918,177 | A | * | 6/1999 | Corriveau et al. ......... 455/432.3 |
| 6,032,043 | A | * | 2/2000 | Houde ....................... 455/433 |
| 6,131,026 | A | * | 10/2000 | Badillo ...................... 455/428 |
| 6,657,552 | B2 | * | 12/2003 | Belski et al. ........... 340/870.02 |

(Continued)

FOREIGN PATENT DOCUMENTS

WO    WO 0056087 A    9/2000

(Continued)

OTHER PUBLICATIONS

Ericsson, "Tdoc N3-030133: Change Request for 3GPP TS 23.172 version 5.1.0; Two step HLR interrogation for SCUDIF calls; pp. 1-6", Feb. 14, 2003, 3GPP TSG CN WG3 Meeting 27, Dublin, Ireland, XP002278611.

(Continued)

*Primary Examiner*—Patrick N Edouard
*Assistant Examiner*—Huy C Ho
(74) *Attorney, Agent, or Firm*—Roger S. Burleigh

(57) ABSTRACT

The invention relates to methods and devices that enable to request more than one service during call set-up. To this end a new indicator is introduced into a request message sent to a database storing subscriber data, for indicating that at least one further request message is sent and a response indicator that a database is adapted to handle said indicator. Furthermore a set of rules is defined how different responses from the database are processed to enable said request.

9 Claims, 4 Drawing Sheets

U.S. PATENT DOCUMENTS

| | | | | |
|---|---|---|---|---|
| 6,804,711 B1 * | 10/2004 | Dugan et al. | ................. | 709/223 |
| 6,987,974 B1 * | 1/2006 | Mostafa et al. | .............. | 455/455 |
| 7,181,202 B2 * | 2/2007 | Rasanen et al. | ............. | 455/418 |
| 2002/0122110 A1 * | 9/2002 | Rasanen | ................... | 348/14.01 |
| 2002/0188725 A1 * | 12/2002 | Mani | ........................... | 709/227 |
| 2005/0096056 A1 * | 5/2005 | Klehn et al. | ................ | 455/445 |

FOREIGN PATENT DOCUMENTS

| | | | |
|---|---|---|---|
| WO | WO 0176288 A | 10/2001 | |

OTHER PUBLICATIONS

Universal Mobile Telecommunications System (UMTS); Technical realization of Circuit Switched (CS) multimedia service; UDI/RDI fallback and service modigication; Stage 2 (3GPP TS 23.172 version 5.1.0 Release 5); pp. 1-21; Dec. 2002, ETSI TS 123 172 V5.1.0 XP002278612, cited in the application, chapters 4.1, 4.2.1, 4.2.2, 4.3.2, 4.3.3.

European Patent Office, International Search Report for PCT/EP03/13862, dated Apr. 29, 2004.

* cited by examiner

Fig. 1  (State of the art)

TWO STEP DATABASE INTERROGATION FOR SUPPORTING THE IMPLEMENTATION OF A FALL-BACK AT CALL SET-UP

The present invention relates to a method and devices for setting up a connection in a system for mobile telecommunications.

The demand for multi-media connections through networks for mobile telecommunications is increasing. However, not all terminals for mobile telecommunication support multi-media connections or their users do not own a subscription for multi-media service. Furthermore, a roaming subscriber may currently be located in a network wherein his multi-media subscription is not valid.

Another matter for handling more than one service is a possible service switching between at least two services during a connection. At said service switching the service used n a connection is changed for example from speech to multi-media and vice versa.

For these cases it is planned to enhance the current call set-up procedure, in particular the inter-working between a call control node and a database for storing subscriber data. The current procedure is described for example by Mouly, Pautet, The GSM System for Mobile Communications, 1992, page 523 and following. The enhancement enables to fall-back for example from a requested multi-media connection to a speech connection. Examples for a demand for said enhancement is the 3GPP standard TS. 23.172, Version 5.1.0, published December 2002. However, the document does not disclose how such fallback can be implemented at the inter-working between call control node and database.

Therefore it is object of the invention to provide a method and devices that provide an inter-working between call control node and a database for storing subscriber data that support the implementation of a fall-back at call set-up.

This will be solved advantageously by the method of claims 1 and 2, the call control node of claim 6 and the database of claim 8.

It is advantageous that an indication is sent that further request messages will sent. This enables the database to request a mobile station roaming number not more than once for one connection. Thus unnecessary reservations of mobile station roaming numbers are avoided.

Further advantageous is the return of an indication that the database is capable of handling said indicator. This enables to introduce databases operating according to the invention step by step into a network. It furthermore enables the inter-working between a call control node according to the invention and a database not operating according to the invention.

Further advantageous embodiments can be derived from the dependent claims.

Advantageous is the ability to send more than two request messages according to claim 2. This enables to control the set up a connection with a higher granularity with respect to fall-back solutions.

SUMMARY

The invention introduces methods and devices that enable to request more than one service during call set-up, for example to enable a fall-back from a first preferred service to a second service if the first service is not applicable or to switch between services during a connection. To this end a new indicator is introduced into a request message sent to a database storing subscriber data, for indicating that at least one further request message is sent and a response indicator that a database is adapted to handle said indicator.

BRIEF DESCRIPTION OF THE DRAWINGS

The following figures show:
FIG. 1 depicts a part of a call set-up as state of the art.

DETAILED DESCRIPTION OF THE INVENTION

In the following the invention will be further described by means of embodiments and by means of figures.

Figure 1A:
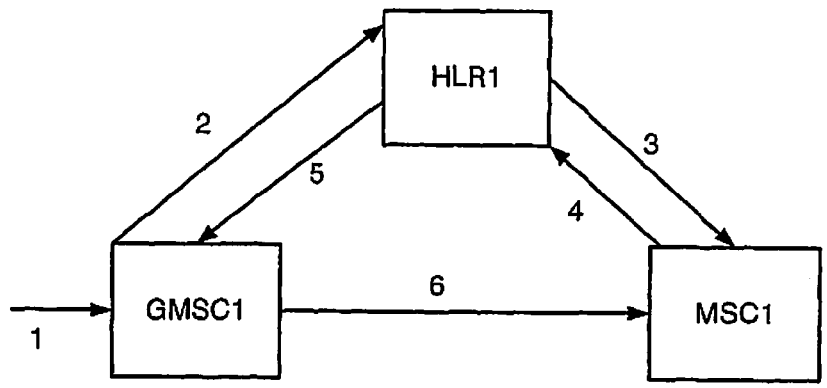
FIG. 1a depicts a part of a call set-up according to the invention.
Figure 1A:
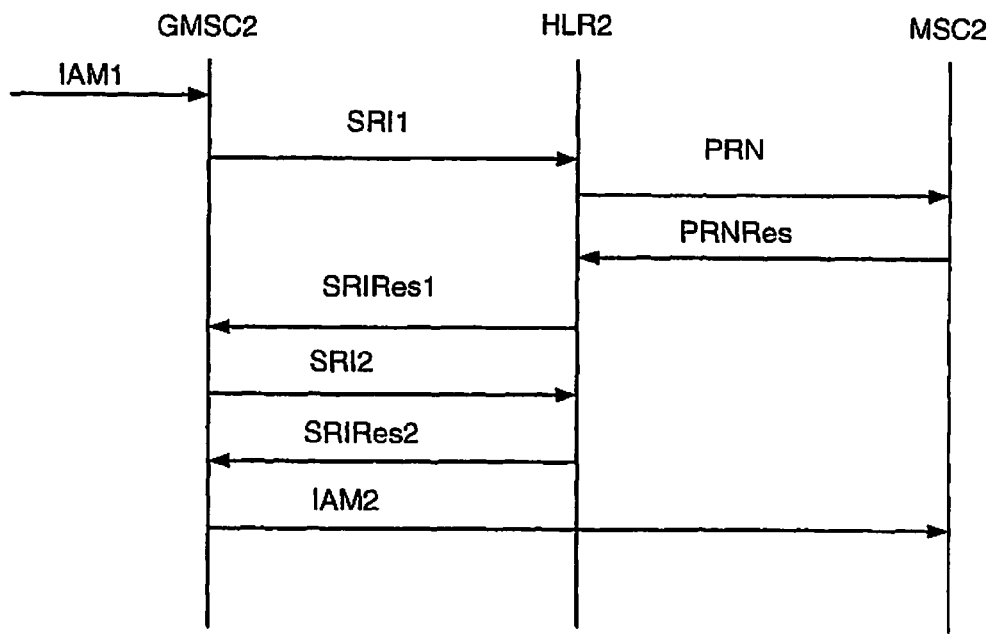

FIG. 1 depicts a part of a call set-up as state of the art. In a first step 1, a gateway mobile services switching centre GMSC1 receives a call request message, for example an initial address message. In a next step 2, the gateway mobile services switching centre GMSC1 sends a routing information request message, e.g. a send routing information message to a home location register HLR1. The home location register HLR1 analyses the received message and determines from subscriber data that the requested service is permitted. It requests a mobile station roaming number from a mobile services switching centre MSC1 that currently serves the called party in a next step 3. The mobile services switching centre MSC1 determines the requested mobile station roaming number and sends it to the home location register HLR1 in a following step 4. The home location register HLR1 forwards the received number to the gateway mobile services switching centre GMSC1 in a next step 5. After the reception of the number, the gateway mobile services switching centre GMSC1 sends a call request message to the mobile services switching centre MSC1 in a last step 6. The provision of a mobile station roaming number may also be executed by the home location register HLR1, wherein the contacting of the mobile services switching centre MSC1 by the home location register HLR1 is not performed, however, this alternative is currently not implemented.

FIG. 1 a shows a part of a call set-up according to the invention. A first call control node, e.g. a gateway mobile services switching centre, GMSC2 receives a call set-up request message IAM1. The call set-up request message IAM1 comprises an indication of a first and a second service. The first call control node GMSC2 sends to a database for storing subscriber data a routing info request message SRI1, e.g. a send routing information message, comprising an identification of a called party, an indication of a service—for example a bearer capability—and an indication that a further request will be sent. The database for storing subscriber data HLR2 determines that the requested service is permitted for the called party and sends a request PRN for a mobile station roaming number to a call control node MSC2 that currently serves the called party. The call control node MSC2 determines the requested number and sends it to the database for storing subscriber data in a return message PRNRes. The database for storing subscriber data sends a response message SRIRes1 to the first call control node GMSC2 comprising the mobile station roaming number and an indication that it is adapted to handle the indicator that at least one further request message will be sent. The first call control node GMSC2 analyses the received response message and sends a second request message SRI2 comprising an indication of the second further service—for example a bearer capability—and an indication that this is the second request to the database for storing subscriber data HLR2. The database for storing subscriber data HLR2 analyses the received message, determines whether the requested service is permitted and returns a second response message SRIRes2. The first call control GMSC2 node sends, based on an analysis of the received response messages SRI1 and SRI2, a call set-up request message to a call control node, in this case the call control node MSC2 serving the called party.

A call control node can be for example a mobile services switching centre or a gateway mobile services switching centre. A database for storing subscriber data can be for example a home location register, a home subscriber server or an AAA-server (Authentication, Authorisation and Accounting server).

Figure 2:
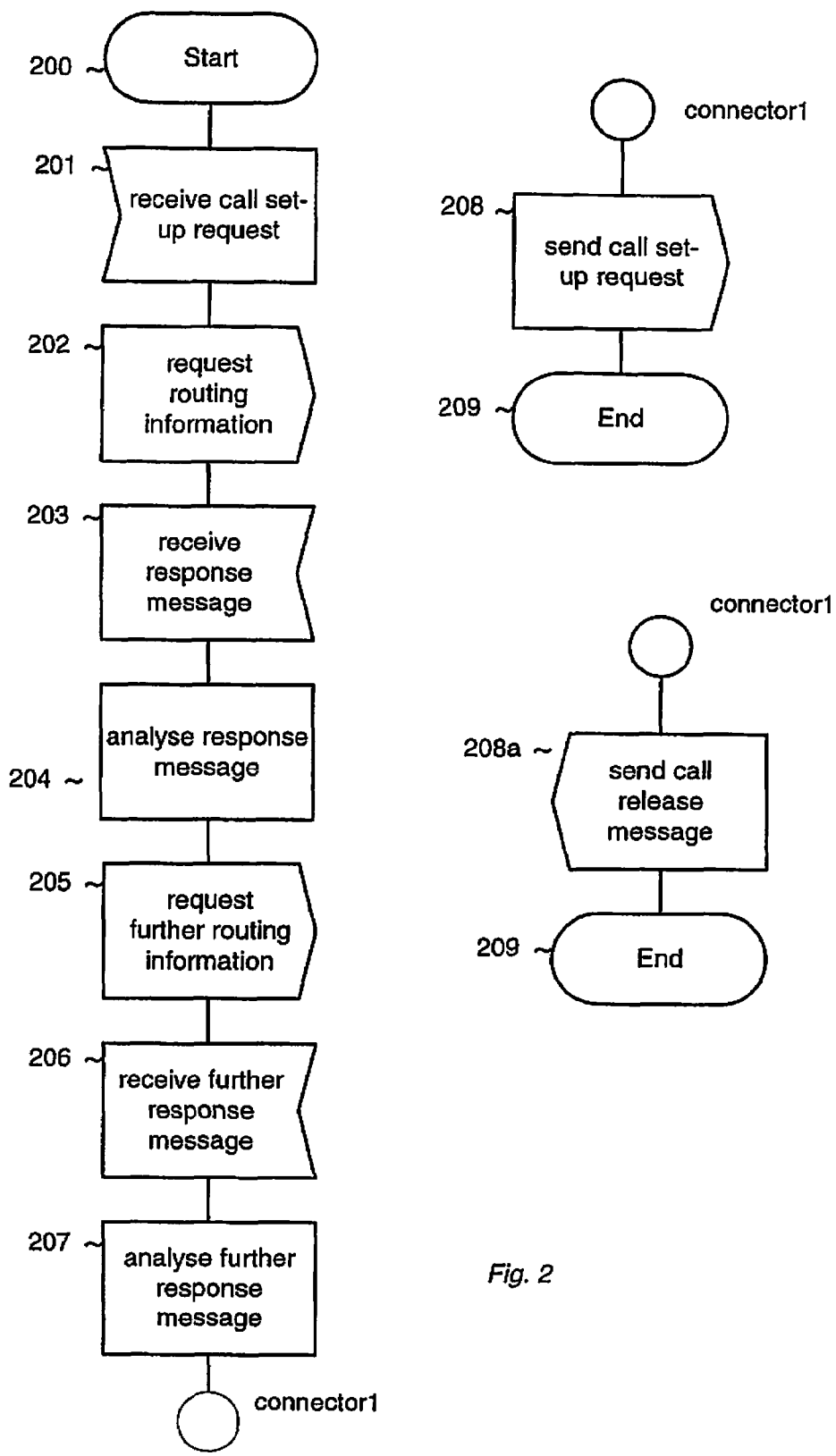
FIG. 2 depicts the invented method as executed in a call control node.

FIG. 2 depicts the invented method as executed by a call control node. For the description of the following figures a gateway mobile services switching centre, and a home location register are selected as examples for a call control node and a database respectively, for explanation but not for limiting purposes. In a first step 200 the method is started. In a following step 201, the gateway mobile services switching centre receives a call request—message, e.g. an initial address message. The call set-up request message comprises an indication of at least two services, a preferred service like multi-media and a fall-back service like speech for a connection towards a called party. In a next step 202 the gateway mobile services switching centre sends a routing information request message to a home location register. The routing information request message comprises an identification of the called party, an indication of a service—for example a speech bearer capability to indicate that a speech service is requested, and an indication that at least one further message will be sent—for example a newly introduced two step indicator.

In a preferred embodiment of the invention an indicator for a speech service is sent first and an indicator for a multi-media service is sent second as for the time being in a terminating mobile services switching centre a speech bearer can be overwritten by a multi-media bearer but not vice versa.

In a following step 203 the gateway mobile services switching centre receives a response message. It analyses the response message in a next step 204 and determines that it comprises an indication that the home location register is adapted to handle the indicator that at least one further request message will be sent.

In a next step 205 the gateway mobile services switching centre sends a further request for routing information comprising an indication of the second service. In a preferred embodiment of the invention this request further comprises an indication that this is a further request. The gateway mobile services switching centre receives a further response message in a next step 206 and analyses it in a following step 207. The following results are possible:

a) If both response messages comprise a mobile station roaming number, the second number is discarded and the mobile services switching centre sends a call set-up request to a further call control node comprising an indication of both requested services.

b) If the first response message comprises a mobile station roaming number and the second response message comprises a forwarded to number, a call set-up message is sent comprising an indication of only one of the requested services. The selection which of the service is indicated can be executed according to predefined user settings or operator settings.

c) If the first response message comprises a mobile station roaming number and the second one comprises an indication that the requested service is not permitted for the called party, a call set-up message comprising an indication of the first service is sent.

d) If the first response message comprises a forwarded to number and the second response message comprises a mobile station roaming number, a call set-up message comprising an indication of only one of the services is sent to the corresponding call control node. The selection which of the service is indicated can be executed according to predefined user settings or operator settings.

e) If both response messages comprise a forwarded to number it depends whether it is the same number in both messages. If it is the same number a call set-up message is sent comprising an indication of both services, if not one of the services is selected as described above and a call set-up message is sent to the corresponding call control node.

f) If a forwarded to number is received in the first response message and an indication that the second service is not permitted for the called party is received in the second response message, a call set-up message comprising an indication of the first service is sent to the corresponding call control node.

g) If an indication that the requested service is not permitted for the called party is received in the first response message, and a mobile station roaming number or a forwarded to number is received in the second response message, a call set-up message is sent comprising an indication of the second service.

h) If an indication that the requested service is not permitted for the called party is received in both response messages, the call is released.

In the cases d), e), f), g), and h), the indication that it is a further request can be omitted in the further routing information request message. In case h) the method continues with step 208a, wherein a call release message is sent by the gateway mobile services switching centre. In the cases a) to g), the method continues in step 208 by sending a call set-up request according to the result of the analysing of the at least one response message.

In an embodiment of the invention, the step 205 is performed repeatedly until one message is sent for each service indication received in the call set-up request message received in step 201.

In a further embodiment of the invention, the gateway mobile services switching centre detects that no indication that the home location register is capable of handling the indication that a further request message is received in the first response message. In this case no further request message is sent and a call set-up request comprising an indication of the first service is sent to the corresponding call control node.

Figure 3:
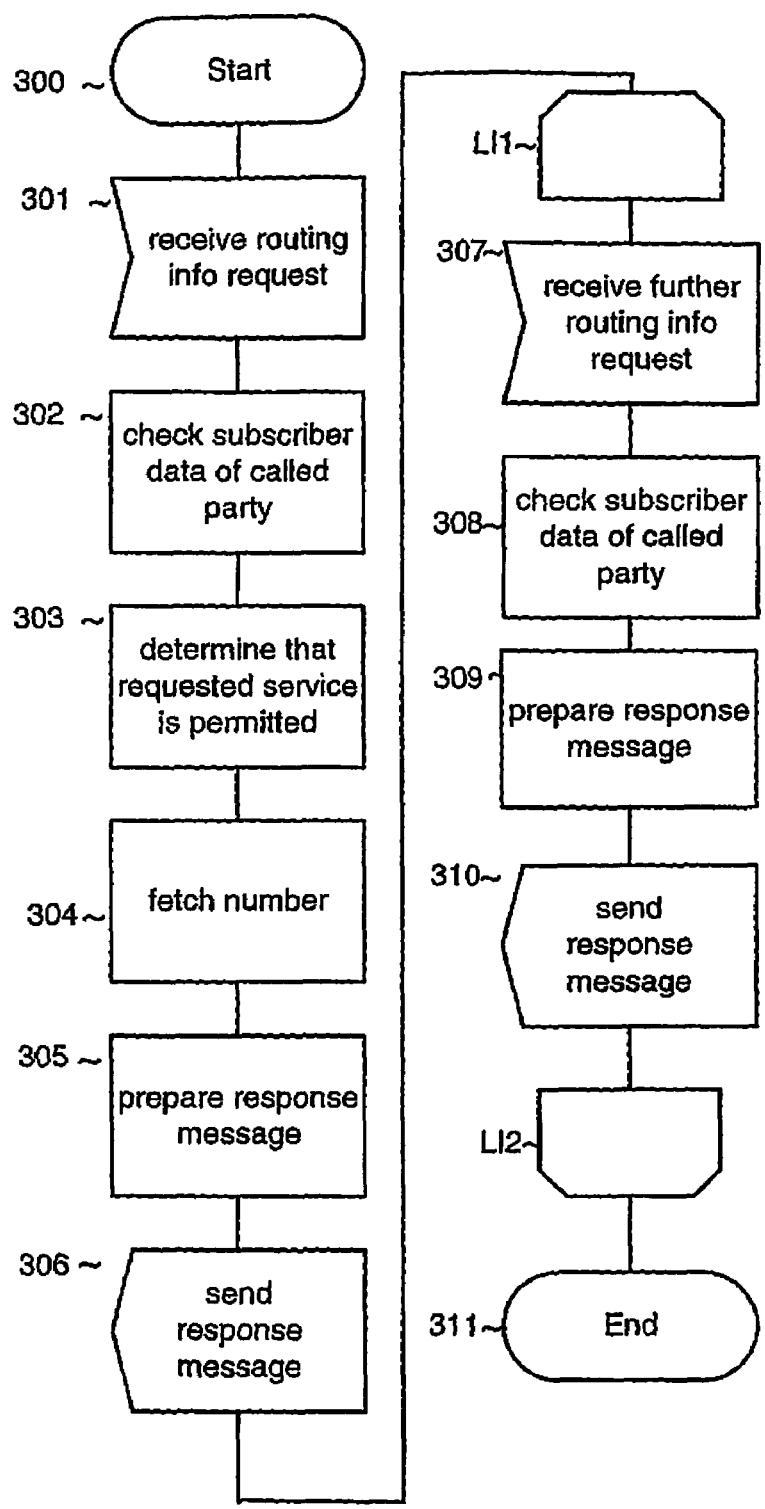
FIG. 3 depicts the invented method as executed in a database for storing subscriber data.

FIG. 3 depicts the invented method as executed in a database for storing subscriber data. In the following said database will be called home location register to make it easier for a person skilled in the art to read the description but not to limit the scope of the invention.

In a first step 300 the method is started. In a next step 301 the home location register receives a routing information request comprising an identification of a called party, an indication of a service and an indication that a further request message will be sent. The home location register checks in a next step 302 the subscriber data of the called party and determines in a next step 303 that the requested service is permitted. In a following step 304 the home location register fetches a number for the further setting up of the connection towards the called party. This number can be for example a mobile station roaming number that is fetched from a mobile services switching centre or a forwarded to number for the called party fetched from a storage.

In a next step the home location register prepares a response message related to the result of the check of step 302. The message comprises the number fetched in step 304 and an indication that the database is adapted to process the indication that at least one further routing information request will be sent. The home location register sends the response message in a next step 306.

The figure comprises a first loop indicator LI1 between the steps 306 and 307 and a second loop indicator LI2 between steps 310 and 311 to illustrate that in an embodiment of the invention the steps 307, 308, 309, and 310 are performed once for each further routing information request that is received.

In a next step 307 the home location register receives the further routing information request. In a next step 308 the home location register checks subscriber data of the called party. It prepares a response message in a next step 309 related to the result of the check of the subscriber data, and sends it in a next step 310. The method ends in a step 311.

Figure 4:
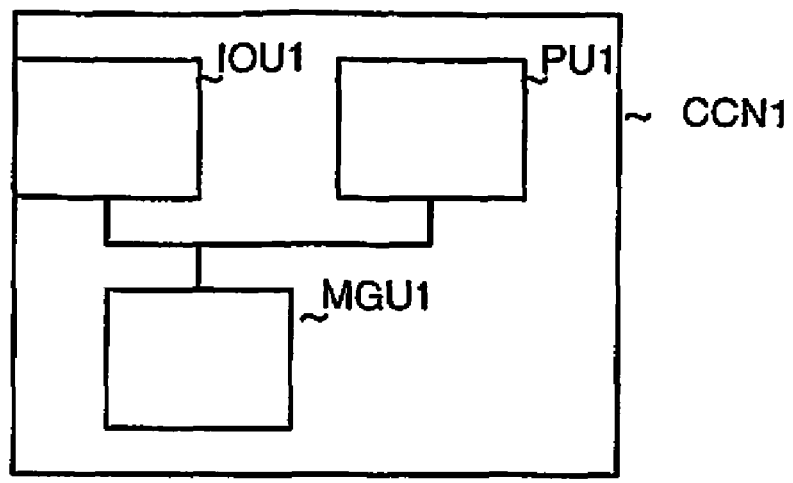
FIG. 4 depicts a call control node according to the invention.

FIG. 4 depicts a call control node CCN1 according to the invention, comprising a message generation unit MGU1 for generating a first routing information request message with an identification of a first service, an identification of a called party and an indicator that at least one further routing request message will be sent and for generating at least one further routing request message comprising an indication of a second service. The call control node CCN1 further comprises an input output unit IOU1 for sending and receiving messages and a processing unit for controlling and coordinating the units of the call control node and for analysing messages. The processing unit it also arranged to process a call set-up request message comprising an indication of two services in a way that it sends a first and a further routing information request message and to handle a call appropriately to a result of an analysis of the received response messages. For example by sending a call set-up request message or a call release message as described by means of FIG. 3.

Figure 5:
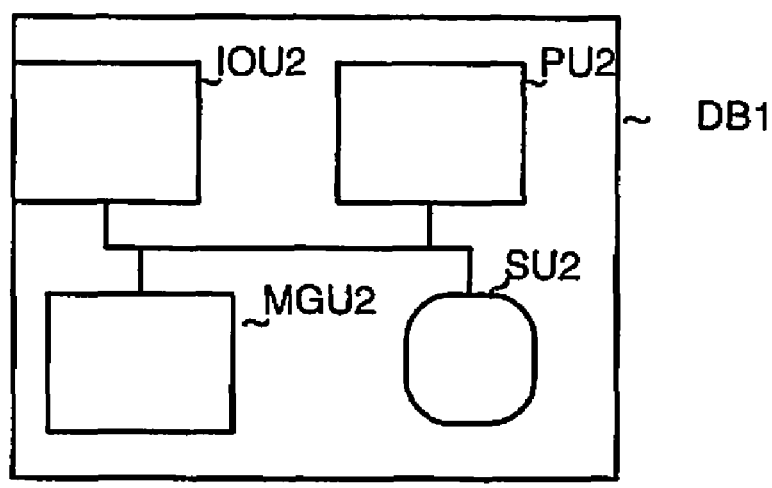
FIG. 5 depicts a database for storing subscriber data according to the invention.

FIG. 5 depicts a database for storing subscriber data comprising a processing unit PU2 arranged to process an indication received in a routing information request message, indicating that at least one further routing request message will be sent, wherein the processing is performed in a way that a mobile station roaming number is fetched and sent only in response to a first routing information request message for a connection and that an indication is returned in said response, indicating that the database is adapted to handle the received indicator.

It is an object of the invention to provide a software adapted to control a call control node in a way that it executes a method according to claim 1 or 2.

It is another object of the invention to provide a software adapted to control a database node in a way that it executes a method according to claim 3 or 4.

What is claimed is:

1. A method for setting up a connection in a system for mobile telecommunications performed by a first call control node comprising a gateway mobile switching center comprising the steps of:

receiving a call set-up request message comprising an indication of at least two services including an indicator of a speech service and an indicator for a multi-media service and an identification of a called party;

sending a routing information request message to a database for storing subscriber data comprising a home location register, wherein the request comprises an identification of a first of the at least two services, an identification of the called party, and an indication that at least one further routing request message will be sent;

receiving a response message from the home location register;

determining that the response message comprises an indication that the home location register is adapted to process the indication that at least one further muting info request message will be sent;

sending a further routing information request message comprising an identification of a further service, and receiving a further response message;

analyzing the received response messages to determine if the home location register is adapted to handle yet at least one further request message; and sending or not in dependence of the result of the analysis a call set-up request message to a further call control node.

2. The method recited in claim 1, wherein the step of sending a further routing information request is repeated until a routing information request message is sent for each service indicated in the call set-up message.

3. The method recited in claim 1, wherein the number is a mobile station roaming number or a forwarded to number.

4. The method recited in claim 1, wherein the routing request message is a send routing information message.

5. The method recited in claim 1, wherein the response message is a send muting information result message.

6. The method recited in claim 1, wherein the call set-up request message is an initial address message.

7. The method recited in claim 1, wherein the further cell control node is a mobile services switching center.

8. A method for setting up a connection in a system for mobile telecommunications, wherein the following steps are performed by a home location register for storing subscriber data:

receiving a routing information request message comprising an identification of a first service being a speech service, an identification of a called party, and an indication that at least one further routing request message for a multi-media service will be sent;

checking subscriber data of the called party to determine if the home location register is adapted to handle further information request messages;

determining that the requested service is permitted for a connection to the called party;

fetching a number for further setting up of the connection towards the called party;

preparing a response message related to the result of the check; and, sending the response message comprising the number for further setting up and an indication that the home location register is adapted to process the indication that at least one further routing info request message for a multi-media service will be sent.

9. The method recited in claim 8, wherein in response to receiving the further routing information request message for a multi-media service, the steps of checking, preparing and sending are performed, and wherein a response message is sent that does not comprise a mobile station roaming number.

* * * * *

UNITED STATES PATENT AND TRADEMARK OFFICE
CERTIFICATE OF CORRECTION

PATENT NO. : 7,668,551 B2 Page 1 of 1
APPLICATION NO. : 10/539194
DATED : February 23, 2010
INVENTOR(S) : Kerr et al.

It is certified that error appears in the above-identified patent and that said Letters Patent is hereby corrected as shown below:

In Column 6, Line 13, delete "muting" and insert -- routing --, therefor.

In Column 6, Line 32, delete "muting" and insert -- routing --, therefor.

In Column 6, Line 35, delete "cell" and insert -- call --, therefor.

Signed and Sealed this

Third Day of August, 2010

David J. Kappos
*Director of the United States Patent and Trademark Office*